May 16, 1961     H. ERDMANN     2,984,144
QUICK-ACTING FASTENERS
Filed Aug. 26, 1958     3 Sheets-Sheet 1
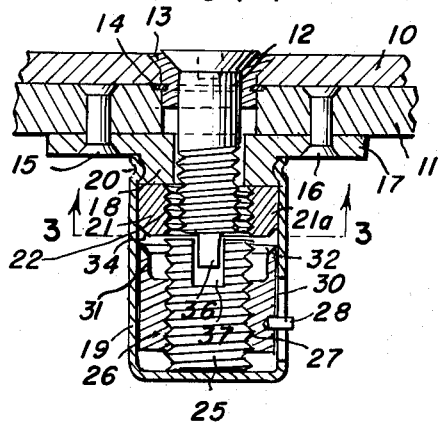
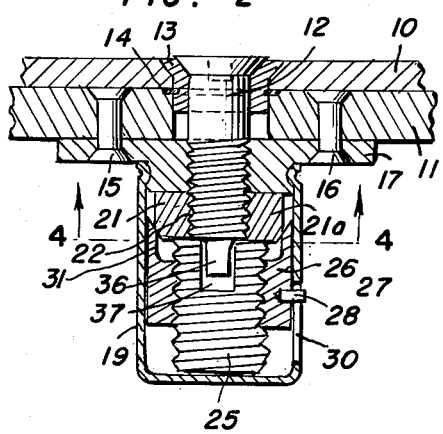
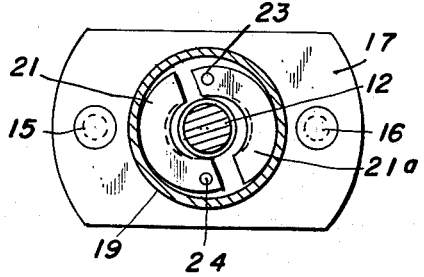
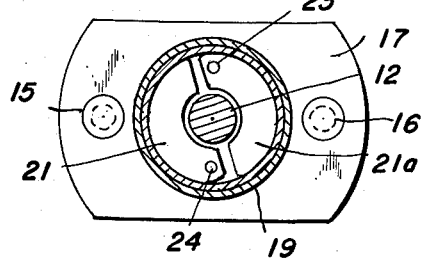
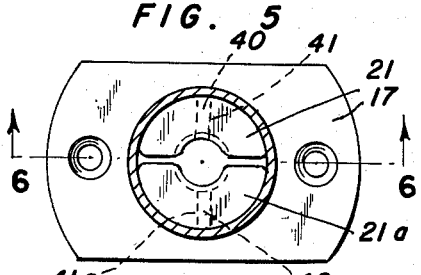
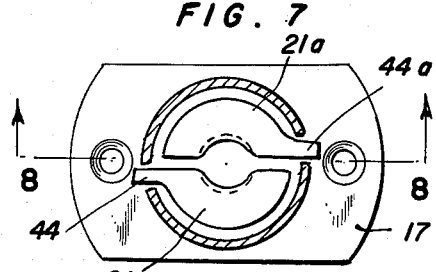
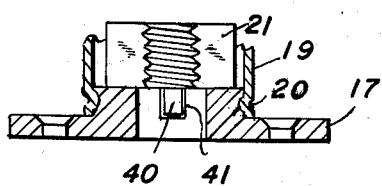
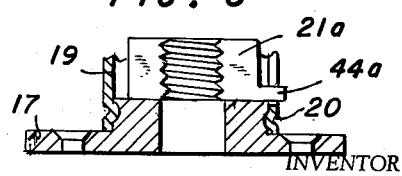
INVENTOR
HANS ERDMANN
BY
ATTORNEY May 16, 1961  H. ERDMANN  2,984,144
QUICK-ACTING FASTENERS Filed Aug. 26, 1958  3 Sheets-Sheet 2

INVENTOR
HANS ERDMANN

BY *Harold Lilecype*

ATTORNEY

May 16, 1961  H. ERDMANN  2,984,144
QUICK-ACTING FASTENERS
Filed Aug. 26, 1958  3 Sheets-Sheet 3
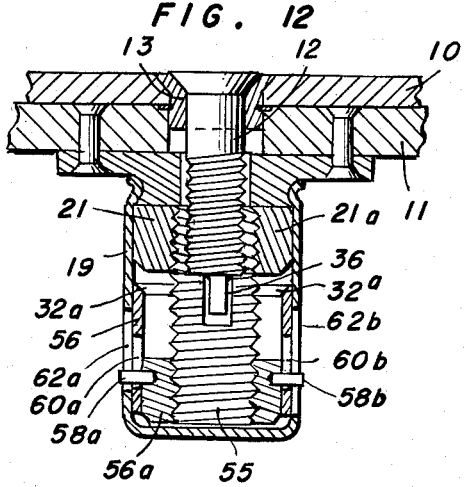
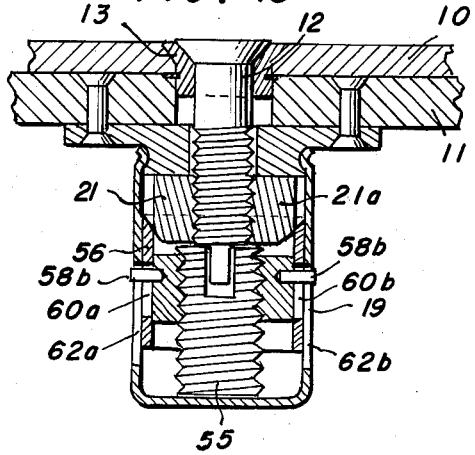
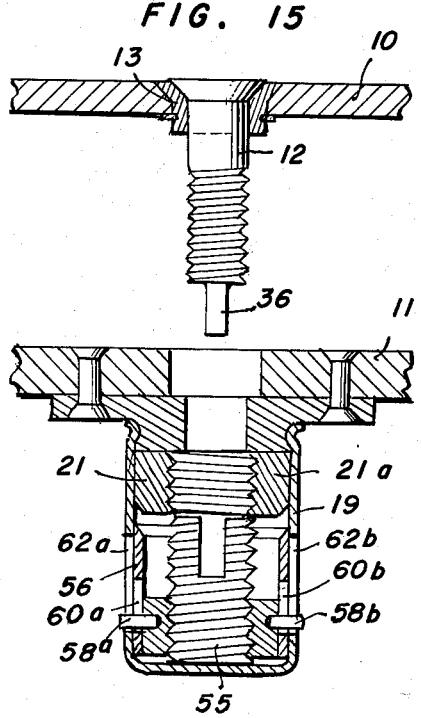
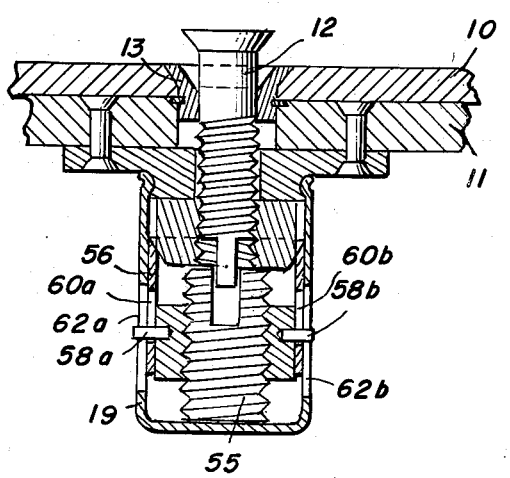
INVENTOR
HANS ERDMANN
BY
ATTORNEY United States Patent Office 2,984,144
Patented May 16, 1961

2,984,144

QUICK-ACTING FASTENERS

Hans Erdmann, Maplewood, N.J., assignor to Waldes Kohinoor, Inc., Long Island City, N.Y., a corporation of New York Filed Aug. 26, 1958, Ser. No. 757,270

11 Claims. (Cl. 85—33)

This invention relates generally to improvements in quick-acting fasteners, and more particularly to an improved bolt and nut fastener of the type adapted to be completed and disengaged by but a small number of turns of the bolt and, because of the inaccessibility of the nut, from the bolt side only of the fastener, and which further possesses the load-carrying capacity, strength and security required of fasteners employed to secure panels, access doors and the like to the skin of the fuselage and/or wings of aircraft.

Quick-acting nut and bolt type fasteners satisfying the aforesaid exacting requirements are of course known in the art, having been disclosed for example in Patent No. 2,576,579, dated November 27, 1951, and Patents Nos. 2,814,324 and 2,814,325, dated November 26, 1957, which with the present application are commonly owned. However, the prior fasteners are based on the principle of a plurality of (preferably two) nut segments operatively contained within a conical nut housing being engaged with and disengaged from the bolt, depending on their axial position in the housing, with such axial position being controlled in part by spring means which normally bias the nut segments towards the larger end of the conical housing, and in part by lever means which force the nut segments into the smaller of the conical housing responsively to entrance of the bolt thereinto. Obviously, such a bolt and nut type fastener represents relatively complicated overall construction, as well as one depending to a substantial degree on the use of spring means likely to lose their reliability due to wear and their resilience when exposed to high heat as very often occurs in high-speed aeroplanes.

Stated broadly, an object of the invention is the provision of a quick-acting nut and bolt type fastener satisfying the exacting requirements of such as fastener applied to secure door panels and the like to the skin of the fuselage and/or wing of aircraft, but which, in contrast to the prior fasteners referred to above, operates on the principle of the plurality of nut segments moving in their own plane only within the nut housing and whose design is further such that no springs or comparable nut-segment biasing means are required or employed.

More particularly, an object of the invention is the provision of a quick-acting nut and bolt type fastener capable of being operated with but a small number of turns of the bolt and from the bolt side only of the fastener, whose construction and arrangement is such that the requirement for moving the nut segments axially within conical housing characterizing the prior quick-acting fasteners serving similar function is completely avoided.

A further object of the invention is the provision of a quick-acting nut and bolt type fastener as last aforesaid, whose construction and arrangement is further such that the spring means heretofore conventionally employed for biasing the nut segments into the larger end of the nut housing and the lever means for actuating the nut segments into the smaller end of the nut housing are similarly eliminated.

A further object of the invention is the provision, in a quick-acting nut and bolt assembly of the above described class and wherein the nut segments are mounted to move only radially, i. e. in their own plane, of novel axially movable means for effecting such radial movement of the nut segments thereby to actuate them to and from their bolt-engaging position.

A more particular object of the invention is the provision of a quick-acting bolt and nut type fastener as last described, wherein the axially movable means for effecting radial movement of the nut segments comprises a screw and sleeve assembly, wherein the screw is turnable by the fastener bolt and the sleeve, which is provided with means for camming the nut segments to their closed or bolt-engaged position and for releasing said nut segments, is axially translatable along the screw responsive to rotation thereof.

Yet another object of the invention is the provision of a quick-acting bolt and nut assembly characterized as in the foregoing and which further incorporates means requiring that a predetermined number of turns of the bolt (in addition to the small degree of rotation thereof required to engage the nut segments with or to disengage them from the bolt) be made before the bolt completes or opens the fastener, as is desirable in dealing with excessive shear separation between the door panel and aircraft skin (or other plates) secured by the fastener.

The above and other objects and features of advantage of a quick-acting nut and bolt type fastener according to the present invention will appear from the following detailed description thereof, in which reference is had to the accompanying drawings illustrating preferred physical embodiments thereof, wherein:

Figs. 1 and 2 are longitudinal sections of one form of fastener of the invention assembled to the panels or plates to be secured thereby in the open and completed positions thereof, respectively;

Fig. 3 is a section taken on line 3—3 of Fig. 1, which shows the nut segments in plan;

Fig. 4 is a similar section taken on line 4—4 of Fig. 2;

Fig. 5 is a view similar to Fig. 3, which illustrates a different way of mounting the nut segments for movement in their plane toward and away from one another;

Fig. 6 is a section on line 6—6 of Fig. 5;

Figs. 7 and 8 are views similar to Figs. 5 and 6, illustrating still another way of mounting the nut segments for movement in their plane toward and away from one another;

Figure 9:
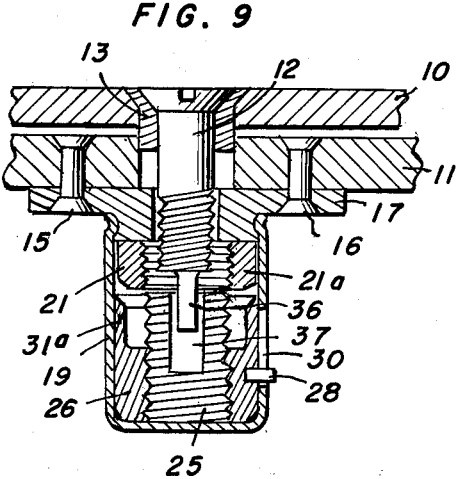
Figure 10:
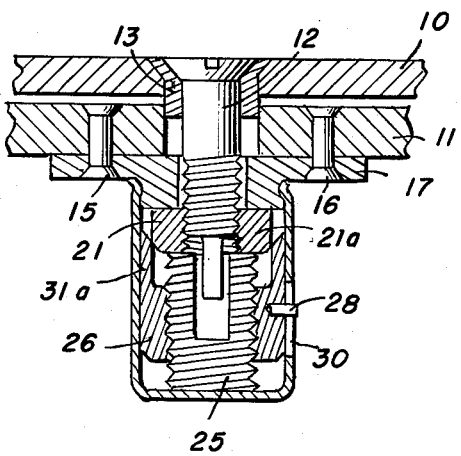
Figure 11:
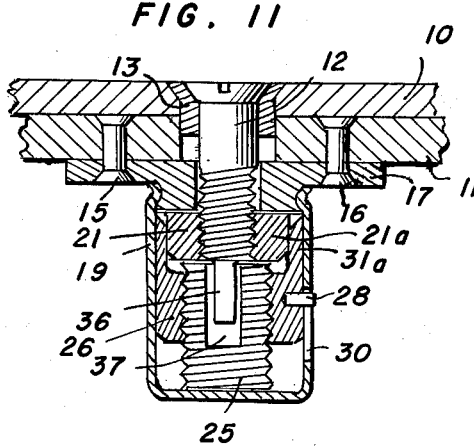
Figure 16:
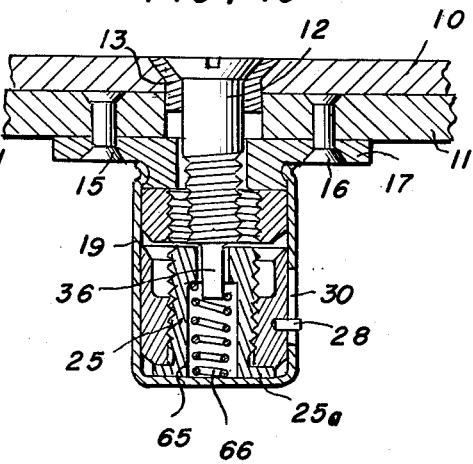

Figs. 9–11, inclusive, are longitudinal sections corresponding generally to Figs. 1 and 2 but illustrative of a modified form of fastener assembly according to the invention;

Figs. 12–14, inclusive, are views similar to Figs. 9–11 but illustrating yet another form of fastener assembly according to the invention;

Fig. 15 shows the Figs. 9–11 form of fastener assembly with parts separated; and Fig. 16 is a view generally similar to Fig. 1 which illustrates certain added features of improvement for incorporation into the basic fastener of the invention.

Referring to the drawngs, and more particularly to Figs. 1–4 thereof, reference numerals 10 and 11 respectively designate outer and under plates or sheets adapted to be fastened together in tight face engagement by a quick-acting bolt and nut-type fastener of the invention, of which the outer plate or sheet 10 may represent a door or closure panel and the under plate 11 the portion of the skin of the fuselage or wing of an aeroplane extending about a cut-out or access opening to the interior thereof, which opening is adapted to be closed and opened by said door or panel. The bolt component 12 of such fastener is adapted to be rendered operative by inserting same through registering openings provided in the panel and skin and, when so inserted, the bolt is protected aganst shear forces whch may develop between said panel and skin as by a shear sleeve 13 affixed to the panel 10 by a retaining ring 14 as shown, the shear sleeve accordingly having sufficient length as to project well into the opening of the skin 11 and thence past the line of juncture between said panel and skin. Fastened to the under face of the skin 11 as by rivets 15, 16 is a nut-housing base plate 17 having a thickened, rearwardly-extending circular neck portion 18 provided with an unthreaded bolt-receiving opening axially aligned with the aforesaid bolt opening of the under plate or skin 11. To this neck portion is secured the nut housing proper 19 and it will be observed that such housing has cup-shaped configuration as defined by a cylindrical body closed at one end. Illustratively, the housing body is affixed at its open end to the housing base plate 17 as by a securing bead 20 spun into a complemental circular groove formed in the peripheral wall of the thickened neck portion 18 of said housing base.

Contained within the housing 19 are a plurality of (preferably two) nut segments 21, 21a provided with internal threads 22 which are adapted to complement one another upon the nut segments or halves being brought together and which of course correspond to the threads of the aforesaid fastener bolt 12. As best seen in Figs. 3 and 4, the outer diameter of the nut segments is somewhat less than the inner diameter of the nut housing 19, and they are connected to the end face of the neck portion 18 of the housing base as by means of pivot pins 23, 24 so that they can swing toward and away from one another.

Also contained within the nut housing 19 relatively inwardly of the nut halves 21, 21a is a screw and sleeve assembly comprising an externally threaded plug or screw 25 and a sleeve 26 which encircles the latter and is provided with internal thread means 27 which engage with the threads of said screw. Whereas the screw 25 may rotate in the space between the nut segments and the closed end of the nut housing 19, the aforesaid sleeve 26 is held against rotation as by means of a pin-and-slot connection with said housing, such illustratively comprising a pin 28 rigid with and extending radially outwardly from the sleeve and which operates in an axial slot 30 cut or otherwise provided in the side wall of the nut housing 19. The length of the slot 30 is of course such as to permit adequate yet limited axial translation of the sleeve along the screw 25. As also seen in Figs. 1 and 2, the sleeve 26 is provided on its end adjacent the nut halves 21, 21a with an extended cylindrical skirt 31, whose end edge is shown to be chamfered so as to provide a conical camming surface 32 adapted to engage with a preferably complementally coned surface 34 provided along the inner-end peripheral corner of the nut segments 21, 21a.

The aforesaid rotary screw 25 is adapted to be rotated by the main fastening bolt 12 upon insertion of the latter into the nut housing 19, and for this purpose the inner or shank end of the bolt 12 is provided with a driving blade or key 36 which is adapted to be projected into a complementally shaped key-slot 37 cut or otherwise formed in the end face of said rotary screw. Accordingly, upon the fastening bolt 12 being pushed into the nut housing 19, fastening bolt and rotary screw 25 are rotationally coupled whereby rotation of the bolt 12 effects corresponding rotation of the screw and proportional axial translation of the sleeve 26 along the screw, in direction depending upon the direction of rotation of the fastening bolt.

The operation of a bolt and nut type fastener as just described will be briefly described as follows: It wll be assumed that in a preliminary operation the panel 10 has been positioned flush or in face engagement against the under plate or skin 11, with the bolt openings in said parts aligned for the reception of each fastening bolt 12. Thereupon, the bolt is pushed through said openings and hence into its companion nut housing 19 to the position illustrated in Fig. 1, in which its shank end is rotationally coupled with the rotary screw 25 operative within said nut housing. It will also be assumed that the nut segments 21, 21a are in their open or release position best shown in Fig. 3 and that the sleeve 26 is disposed towards the closed or inner end of the nut housing as in Fig. 1. Turning of the fastening bolt 12 in clockwise (fastener-engaging) direction thus effects corresponding rotation of the rotary screw 25 and proportional axial translation of the sleeve 26 towards the sigments 21, 21a. Preferably, the pitch of the threads of the fastener bolt 12 is less than the pitch of the threads of the rotary screw 25 and hence the sleeve 26 moves toward and against the nut segments with a relatively small number of turns of the bolt 12. Such movement brings the conical end edge 32 of the sleeve skirt 31 into engagement with the adjacent peripheral-edge corner of the nut segments and thereby closes same on the main fastening bolt 12, whereupon a small continued turning of said bolt 12 effects completion of the fastening. Opening of the fastener is of course effected by turning the fastener bolt 12 in the opposite or unthreading direction, as results in the sleeve 26 moving axially away from the nut segments 21, 21a as effects their release for axial withdrawal of the bolt 12 without further turning same.

Instead of pivotally connecting the nut segments 21, 21a to the base plate 17 of the nut housing as in the Figs. 1–4 modification, they may be mounted in the other ways suggested in Figs. 5–8. Referring to the Figs. 5 and 6 form of mounting the nut segments, the end faces of the nut segments adjacent the corresponding end face of the housing-base neck portion 18 are provided with radial ribs or keys 40, 40a extending on a diameter of the nut as a whole and said end face of the neck portion is provided with complemental slots 41, 41a into which said ribs extend. Thus, movement of the nut segments in straight radial direction, i.e. the horizontal plane of the segments, is assured, it being understood that said nut segments are prevented from dropping away from the neck portion 18 by the engagement of their inner end faces on the adjacent end of the rotary screw 25.

According to the Figs. 7 and 8 form of mounting, the nut segments are formed with laterally extending offsets or fingers 44, 44a which extend through openings 45, 45a provided therefor in diametrically opposite sidewall portions of the nut housing 19. Thus, the fingers enable limited swinging movement of the nut segments in their own plane, as permits their opening and closing movement with respect to the bolt 12.

Under certain conditions encountered in actual practice, it sometimes becomes advisable if not necessary to provide that the bolt be turned a greater number of turns than ordinarily required to effect engagement of the nut segments with or their release from the bolt. For example, when in securing the panel in place it is necessary to force the panel 10 "home" against the skin 11, it becomes clearly desirable that some turns of the bolt be utilized to assist in finally closing the panel against the skin and such turns must obviously be in addition to those required to engage the nut segments with the bolt. So, too, in unfastening a secured panel 10 from the skin 11 against the frictional holding effect of residual shear forces which have developed between panel and skin and which tend to hold the panel to the skin, it is desirable that the bolt be turned a small number of turns before the nut segments disengage from the bolt, thus in effect to use the force developed by the bolt in backing from the nut to assist in initially breaking the frictional connection between panel and skin.

To deal with such conditions when likely to be encountered, the invention provides the somewhat modified nut construction illustrated in Figs. 9–11 inclusive. Of such views, Figs. 9 and 11 correspond to Figs. 1 and 2, respectively, in that Fig. 9 illustrates the fastener assembly in the fully assembled but open position, and Fig. 11 illustrates the fastener assembly in the fastener-closed or completed position. The difference between the modified or Figs. 9–11 fastener and the Figs. 1 and 2 fastener resides in the fact that, whereas in the earlier described fastener the camming edge 32 of the sleeve skirt 31 moves only against the nut segments 21, 21a and is then stopped thereby, the sleeve skirt and nut housing of the modified fastener are so dimensioned that, after engaging the nut segments, the sleeve is not stopped thereby but, instead, may move axially therealong. More particularly, and as best seen in Fig. 10, the sleeve skirt 31a of the modified fastener has internal diameter slightly greater than the external diameter of the nut upon the later being closed on the bolt by movement of its segments 21, 21a towards one another, and the nut housing 19 is also provided with slightly greater diameter so as to accommodate the sleeve skirt and segments enclosed thereby.

Accordingly, as will be seen by reference to Figs. 9 and 10, wherein it will be observed that the panel 10 is slightly spaced from the skin 11 to which it is to be secured in tight face engagement, the first turn or few turns of the fastener bolt 12 in clockwise (fastener-closing) direction brings the camming edge of sleeve 31a into abutment with the outer peripheral edge of the nut segments and effects their closing on the bolt as heretofore, and the few additional turns given the bolt function to draw the panel 10 down on the skin 11 consequent to the bolt threading into the nut whose segments are meantime held closed by the progressive movement of the sleeve skirt into the space between nut and nut housing, all as illustrated in Fig. 11. When breaking or opening the fastener, the reverse effect is attained. That is to say, as analysis of Fig. 11 will show, the first few turns of the bolt 12 in counter-clockwise (unfastening) direction will result in the bolt backing off from the nut consequent to the segments 21, 21a thereof being held closed on the bolt by the sleeve skirt 31a, as above, and accordingly initial separation of panel from skin is facilitated. The final turn or turns of the bolt are then employed to release the nut segments from the bolt, whereupon the bolt may be pulled from the nut housing either alone or with the panel as it moves away from the skin.

Referring to the Figs. 12–15 modification also requiring that the bolt be given a small number of turns in addition to the turn or turns required to engage the bolt segments 21, 21a with or to release them from the bolt 12, it will be observed that, rather than the rotary screw 55 (corresponding exactly to the rotary screw 25 of the Figs. 1–4 form of fastener) threading directly into an axially translatable sleeve, such as the aforesaid sleeve 26, said screw of the modified fastener instead threads into an internally threaded collar 56a contained within and having a lost motion connection with such axially translatable sleeve, which latter is designated 56 in Figs. 12–15. More particularly, the collar 56a has a pin-and-slot connection with both the sleeve 56 and the nut housing 19, such comprising preferably two diametrically arranged pins 58a, 58b extending radially from the collar into axial slots 60a, 60b provided in said sleeve 56 and into corresponding axial slots 62a, 62b provided in the housing 19. Accordingly, both collar 56a and the encircling sleeve 56 are restrained from rotation with the rotary screw 55 but are axially translatable therealong. Moreover, by making the sleeve slots 60a, 60b short as compared to the housing slots 62a, 62b and by properly relating the two sets of slots axially with respect to one another, the collar 56a moves axially with the sleeve 56 upon the lost motion between said parts, as measured by the sleeve slots 60a, 60b, having taken place.

It will be understood that the sleeve 56 itself constitutes the skirt portion corresponding to the skirt portion 31 of the sleeve 26 of the Figs. 1–4 fastener and that the end edge of the sleeve is chamfered so as to provide a conical camming surface 32a for abutting the inner peripheral corner of the nut segments 21, 21a, similar to the edge surface 32 of said sleeve 26.

The operation of the Figs. 12–15 form of fastener is briefly as follows: Assuming the parts to be fastened and the fastener components to have been brought from their physically separated position shown in Fig. 15 to their assembled but fastener-open relationship shown in Fig. 12, it will be noted that the sleeve 56 and collar 56a are in their innermost or most retracted position within the nut housing 19 as results from the last previous opening of the fastener. Accordingly, by virtue of the lost-motion connection between collar 56a and sleeve 56, the first turn or few turns of the bolt 12 are required to actuate the sleeve axially into engagement with the nut segments 21, 21a, which turns are in addition to the turn required to close the nut segments on the bolt. This operation is of course somewhat different from that described above for the Figs. 9–11 fastener, since here the additional turns are not employed to assist in finally engaging the panel 10 on the skin. However, the operation of the Figs. 12–15 fastener during opening thereof in assisting the separation of the panel from skin is on a par with that of the Figs. 9–11 fastener. That is to say, assuming the fastener to be fully closed as in Fig. 13, the first few turns of the bolt in counter-clockwise direction to open the fastener results only in the collar 56a moving along the screw 23 for the length of the slots 60a, 60b, which movement is independent of the sleeve 56, which latter still engages with and holds the nut segments 21, 21a closed on the bolt. Accordingly, upon such first turning of the bolt during which it unthreads from the nut to a position illustratively shown in Fig. 14, its backing-off force assists to a degree in effecting separation of panel from skin. Upon the aforesaid lost motion having taken place, a continued turn or so of the bolt effects movement of the sleeve 56 away from the nut segments whereupon they disengage from the bolt which is now free to be grasped and pulled outwardly from the housing.

Referring now to Fig. 16, such illustrates two features of practical merit for incorporation in any one or all forms of fastener as described to their advantage. The first such feature deals with facilitating grasping of the bolt preliminary to its being pulled from its panel and/or nut housing. In explanation, it sometimes happens that the bolt becomes stuck in its opening in the panel 10, so that even though the nut segments 21, 21a have disengaged therefrom the bolt must be pried loose. To correct this difficulty, the rotary screw 25 is bored out as at 65, and in said bore is placed a spring 66 against which the driving key 36 of the bolt engages to compress same when pushed "home" into the nut housing. The energy stored up in said spring is of course released upon disengagement of the nut segments from the stuck bolt and acts to push the bolt outwardly from the panel 10 so that its head may be grasped for ready bolt removal.

The second of the aforesaid features has to do with preventing undesired axial movement of the rotary screw 25 resulting from excessive turning of the bolt 12 in counter-clockwise or fastener-opening direction. In explanation, and using the Figs. 1–4 form of fastener by way of example, should turning of the bolt be continued indefinitely, sleeve 26 will move against and abut the closed inner end of the nut housing. Since it can move no farther, any further turning of the bolt 12 will result in the rotary screw "climbing up" the threads of the sleeve and jamming the nut segments. To prevent this undesirable condition from ever happening, the inner end of the rotary screw 25 is provided with a radial foot flange 25a on which the sleeve seats when the latter is moved axially to its innermost position. Consequently thereto, the rotary screw cannot now "climb up" the sleeve as aforesaid, and accordingly jamming of the fastener parts is prevented.

Without further analysis, it will be appreciated that a bolt and nut type fastener of the present invention according to the various forms thereof disclosed in the foregoing achieves the objects of the invention as set forth in the above in simple yet effective and thoroughly dependable manner. More particularly, a bolt and nut fastener as herein proposed depends in nowise upon axial movement of the nut segments 21, 21a, and it also does away with any requirement for spring and lever means for opening and closing the nut segments as characterized the prior quick-acting bolt and nut fasteners serving similar function.

However, as many changes could be made in carrying out the above constructions without departing from the scope of the invention, it is intended that all matter contained in the above description or shown in the accompanying drawing shall be interpreted as illustrative and not in a limiting sense.

I claim:

1. A bolt and nut fastener comprising, in combination, a nut housing, a bolt adapted to be inserted in the housing, a multi-segment nut contained in said housing, the segments of which are mounted solely for movement in their own plane toward and away from one another to respective positions in which they engage and disengage the bolt, and means operable by the bolt for positively actuating said nut segments into engagement with the bolt comprising a coaxial sleeve contained in and being axially movable with respect to said housing and having internal thread means and an end portion adjacent the nut having external diameter greater than that of the nut when the segments thereof are in open position and being provided with an inclined camming surface extending from approximately said external diameter to a lesser internal diameter which is such that said surface is adapted to coact with the nut segments thereby to actuate them into engagement with the bolt upon the latter being inserted in the housing responsive to axial movement of the sleeve toward said nut, means operative between the housing and sleeve for preventing rotation of said sleeve, a rotary screw contained within the sleeve and having threaded engagement therewith, said bolt upon insertion and said screw being coaxially related and provided on their adjacent ends with complemental coupling means whereby, when the bolt is turned, said screw is similarly turned to impart axial movement to the sleeve and said sleeve thereupon coacts with the nut segments as aforesaid.

2. A bolt and nut fastener substantially as set forth in claim 1, wherein said internal thread means on the sleeve comprises internal threads mating with the threads of the screw.

3. A bolt and nut fastener comprising, in combination, a nut housing, a bolt adapted to be inserted in the housing, a multi-segment nut contained in said housing, the segments of which are mounted solely for movement in their own plane toward and away from one another to respective positions in which they engage and disengage the bolt, and means operable by the bolt for positively actuating said nut segments into engagement with the bolt comprising an internally threaded sleeve contained in and coaxial with the housing and having an extended end portion whose edge is adapted to coact with the nut segments thereby to actuate then into engagement with the bolt upon the latter being inserted in the housing, said sleeve being provided at its other end with a pin and slot connection with the housing permitting axial movement of said sleeve within but preventing its rotation relative to housing, a rotary screw disposed within the sleeve and having threaded engagement therewith, said bolt and said rotary screw being coaxially related and being each provided with complemental coupling means whereby rotation of the bolt effects corresponding rotation of the screw and thereby axial translation of the sleeve along the screw, and said sleeve thereupon coacts with the nut segments as aforesaid.

4. A bolt and nut fastener comprising, in combination, a nut housing, a bolt adapted to be inserted in the housing, a multi-segment nut contained in said housing, the segments of which are mounted solely for movement in their own plane toward and away from one another to respective positions in which they engage and disengage the bolt, and means operable by the bolt for positively actuating said nut segments into engagement with the bolt comprising an outer sleeve coaxial with the housing and having at one end a cylindrical skirt portion whose edge is adapted to coact with the nut segments thereby to actuate them into engagement with the bolt upon the latter being inserted in the housing, means operative between the sleeve and the housing permitting axial movement of the sleeve within but preventing its rotation relative to the housing, and means for moving said sleeve axially, said last means comprising a rotary screw coaxial with said bolt, coupling means operative between the adjacent ends of said bolt and screw, an internally threaded collar axially translatable on said rotary screw, and a lost motion connection between said collar and said sleeve, whereby when the nut segments are threadedly engaged therewith said bolt may be unthreaded from the segments an amount corresponding to the lost motion provided by said lost motion connection prior to the outer sleeve moving axially away from the nut segments.

5. A bolt and nut fastener substantially as set forth in claim 4, wherein said lost motion connection comprises pin and slot means which is also effective between said collar and nut housing.

6. A bolt and nut fastener comprising, in combination, a nut housing, a bolt adapted to be inserted in the housing, a multi-segment nut contained in said housing, the segments of which are mounted solely for closing and opening movement in their own plane to respective positions in which they engage with and disengage the bolt, and means operable by said bolt when the latter is inserted in said housing for positively actuating the nut segments to closed position in which they engage with the bolt, said means including a rotary screw contained within the housing, means for rotationally coupling the bolt and screw whereby rotation of the bolt effects rotation of the screw, a sleeve member provided with means for preventing its rotation relative to the housing and having a threaded connection with the screw whereby it is axially translatable therealong in direction toward and away from the nut, the end portion of the sleeve adjacent the nut having external diameter intermediate that of the internal diameter of the housing and of the nut when the segments thereof are in open position and being provided with an inclined camming surface extending from approximately said external diameter to an inner diameter which is such as to render said surface operative to engage the outer edge of the nut segments when moving towards said nut thereby to close the nut segments on the bolt.

7. A bolt and nut fastener substantially as set forth in claim 6, wherein the inner diameter of the inclined camming surface edge is less than the outer diameter of the nut when the latter is fully closed on the bolt.

8. A bolt and nut fastener substantially as set forth in claim 6, wherein the end edge of the sleeve comprises said inclined camming surface and the inner diameter of said edge is greater than the outer diameter of the nut when the latter is fully closed on the bolt, whereby following closing of the nut segments the sleeve may move thereover an axial distance corresponding to a predetermined number of turns of the bolt and whereby to open the fastener the bolt must be given said predetermined number of turns preliminary to the sleeve disengaging from the nut.

9. A bolt and nut fastener substantially as in claim 6, wherein said rotary screw is provided with means for preventing its axial movement with respect to the sleeve with continued turning of the bolt upon predetermined axial movement of the sleeve away from the nut having occurred.

10. A bolt and nut fastener substantially as set forth in claim 6, wherein said rotary screw is provided with a radial flange with which the sleeve is adapted to abut upon predetermined axial movement of the said sleeve away from said bolt having occurred.

11. A bolt and nut fastener substantially as set forth in claim 1, including spring means reactive between the screw and housing and being operative to bias the bolt relatively outwardly from the housing.

References Cited in the file of this patent

UNITED STATES PATENTS

| | | |
|---|---|---|
| 2,504,018 | Gibson | Apr. 11, 1950 |
| 2,814,324 | Shur | Nov. 26, 1957 |

FOREIGN PATENTS

| | | |
|---|---|---|
| 558,302 | Great Britain | Dec. 30, 1943 |